(12) United States Patent
Miyabe et al.

(10) Patent No.: US 7,529,453 B2
(45) Date of Patent: May 5, 2009

(54) OPTICAL FIBER AND OPTICAL TRANSMISSION MEDIUM

(75) Inventors: Ryo Miyabe, Tokyo (JP); Yu Mimura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/791,855

(22) PCT Filed: Sep. 13, 2006

(86) PCT No.: PCT/JP2006/018194

§ 371 (c)(1),
(2), (4) Date: May 30, 2007

(87) PCT Pub. No.: WO2007/043277

PCT Pub. Date: Apr. 19, 2007

(65) Prior Publication Data

US 2008/0124036 A1 May 29, 2008

Related U.S. Application Data

(60) Provisional application No. 60/724,890, filed on Oct. 11, 2005.

(30) Foreign Application Priority Data

Mar. 20, 2006 (JP) .............................. 2006-077559

(51) Int. Cl.
*G02B 6/032* (2006.01)

(52) U.S. Cl. ...................................... 385/125; 385/123
(58) Field of Classification Search ........................ None
See application file for complete search history.

(56) References Cited

U.S. PATENT DOCUMENTS 6,418,258 B1 * 7/2002 Wang .......................... 385/125
6,792,188 B2 * 9/2004 Libori et al. ................. 385/125

(Continued)

FOREIGN PATENT DOCUMENTS

JP            3306847           5/2002

(Continued)

OTHER PUBLICATIONS

Kunimasa Saitoh, et al., "Bending-Insensitive Single-Mode Hole-Assisted Fibers With Reduced Splice Loss", Optics Letters, vol. 30, No. 14, pp. 1779-1781, 2005.

(Continued)

*Primary Examiner*—Sung H Pak
*Assistant Examiner*—Mike Stahl
(74) *Attorney, Agent, or Firm*—Oblon, Spivak, McClelland, Maier & Neustadt, P.C.

(57) ABSTRACT

An optical fiber includes a core region and a cladding region. The cladding region includes a first cladding region on outer circumference of the core region, which includes a main-medium region and a sub-medium region having a refractive index lower than that of the main-medium region. The sub-medium region includes a plurality of inner sub-medium regions arranged along the outer circumference of the core region and a plurality of outer sub-medium regions arranged on outer of the inner sub-medium regions. The outer sub-medium regions have a lateral cross section larger than that of the inner sub-medium regions.

18 Claims, 6 Drawing Sheets

U.S. PATENT DOCUMENTS

| | | | |
|---|---|---|---|
| 7,085,464 | B2 | 8/2006 | Miyabe et al. |
| 7,164,830 | B2 | 1/2007 | Hiroishi et al. |
| 2001/0024557 | A1* | 9/2001 | Hasegawa et al. ........... 385/125 |
| 2004/0052484 | A1* | 3/2004 | Broeng et al. ................ 385/125 |
| 2006/0002674 | A1* | 1/2006 | Wu et al. ..................... 385/125 |
| 2006/0034574 | A1* | 2/2006 | Guan et al. .................. 385/125 |

FOREIGN PATENT DOCUMENTS

| | | |
|---|---|---|
| JP | 2002 277665 | 9/2002 |
| JP | 2004 220026 | 8/2004 |
| JP | 2005 301024 | 10/2005 |
| WO | 2005 010583 | 2/2005 |

OTHER PUBLICATIONS

Yukihiro Tsuchida, et al., "A Design Method for Single-Mode Holey Fibers With Low Bending Losses", the Transactions of the Institute of Electronics, Information and Communication Engineers, vol. J88-C, No. 7, pp. 512-518, 2005, (with English abstract).

Yukihiro Tsuchida, et al., "Low Bending Loss Holey Fiber With Reduced Splice Loss", The Institute of Electronics, Information and Communication Engineers, p. 244, C-3-74, 2005, (with English abstract).

T. Hasegawa, et al., "Recent Advances in Applications of Holey Fibers", 9TH Microoptics Conference (MOC'03), K2, 2003.

Daizo Nishioka, et al., "Development of a Holey Fiber With Ultra-Low Bending Loss", Techinical Report of IEICE, pp. 23-26, 2003.

U.S. Appl. No. 11/791,855, filed May 30, 2007, Miyabe et al.
U.S. Appl. No. 11/815,243, filed Aug. 1, 2007, Miyabe et al.
U.S. Appl. No. 11/909,045, filed Sep. 18, 2007, Miyabe et al.
U.S. Appl. No. 11/908,975, filed Sep. 18, 2007, Miyabe et al.
U.S. Appl. No. 11/791,855, filed May 30, 2007, Miyabe et al.
U.S. Appl. No. 11/791,855, filed May 30, 2007, Miyabe et al.
U.S. Appl. No. 12/169,182, filed Jul. 8, 2008, Miyabe et al.

* cited by examiner

FIG.3

|  | CUT-OFF WAVELENGTH | MACRO-BENDING LOSS r=7.5 mm | MACRO-BENDING LOSS r=5 mm | MFD |
|---|---|---|---|---|
| MEASUREMENT WAVELENGTH |  | 1550 nm | 1550 nm | 1550 nm |
|  | nm | dB/m | dB/m | μm |
| SAMPLE #1 | 1450 | 0.008 | 0.034 | 6.82 |

FIG.4

|  | Δn1 | CUT-OFF WAVELENGTH | MACRO-BENDING LOSS r=7.5 mm | MACRO-BENDING LOSS r=5 mm | MFD |
|---|---|---|---|---|---|
| MEASUREMENT WAVELENGTH |  |  | 1550 nm | 1550 nm | 1550 nm |
|  | % | nm | dB/m | dB/m | μm |
| SAMPLE #1 | 0.37 | 1450 | 0.008 | 0.034 | 6.82 |
| SAMPLE #2 | 0.33 | 1400 | 0.019 | 0.069 | 6.86 |
| SAMPLE #3 | 0.4 | 1520 | 0.004 | 0.019 | 6.79 |

FIG.5

| | Δn1 | d2 | L2 | CUT-OFF WAVE-LENGTH | MACRO-BENDING LOSS r=7.5 mm | MACRO-BENDING LOSS r=5 mm | MFD |
|---|---|---|---|---|---|---|---|
| MEASUREMENT WAVELENGTH | | | | | 1550 nm | 1550 nm | 1550 nm |
| | % | μm | μm | nm | dB/m | dB/m | μm |
| SAMPLE #4 | 0.33 | 7.5 | 13.15 | 1300 | 0.056 | 0.217 | 6.87 |
| SAMPLE #5 | 0.37 | 7.5 | 13.15 | 1350 | 0.024 | 0.103 | 6.83 |
| SAMPLE #6 | 0.40 | 7.5 | 13.15 | 1400 | 0.012 | 0.059 | 6.80 |
| SAMPLE #7 | 0.33 | 7.2 | 13.15 | 1250 | 0.098 | 0.396 | 6.87 |
| SAMPLE #8 | 0.37 | 7.2 | 13.15 | 1310 | 0.043 | 0.187 | 6.83 |
| SAMPLE #9 | 0.40 | 7.2 | 13.15 | 1360 | 0.022 | 0.104 | 6.80 |
| SAMPLE #10 | 0.33 | 8.3 | 13.60 | 1340 | 0.026 | 0.107 | 6.87 |
| SAMPLE #11 | 0.37 | 8.3 | 13.60 | 1410 | 0.011 | 0.050 | 6.83 |
| SAMPLE #12 | 0.40 | 8.3 | 13.60 | 1460 | 0.006 | 0.028 | 6.80 |
| SAMPLE #13 | 0.33 | 7.0 | 12.90 | 1280 | 0.093 | 0.343 | 6.87 |
| SAMPLE #14 | 0.37 | 7.0 | 12.90 | 1350 | 0.040 | 0.166 | 6.83 |
| SAMPLE #15 | 0.40 | 7.0 | 12.90 | 1380 | 0.021 | 0.094 | 6.80 |

OPTICAL FIBER AND OPTICAL TRANSMISSION MEDIUM

TECHNICAL FIELD

The present invention relates to a microstructured optical fiber, in which a plurality of sub-medium regions consisting of a sub medium having a refractive index lower than that of a main medium in a cladding thereof, and an optical transmission medium.

BACKGROUND ART

In general, an optical fiber is composed of a core region and a cladding region. The core region is made of a silica glass of which a refractive index is increased by doping, for example, a germanium. The cladding region is made of a silica glass having a refractive index lower than that of the core region, which forms a layer surrounding a circumference of the core. A light propagates through the core region by a total reflection of the light at a boundary between the core region and the cladding region. Conventionally, a relative refractive index difference between the core region and the cladding region is at largest 3% to 4%.

On the other hand, in recent years, an optical fiber has been reported with which a large relative refractive index difference can be obtained compared to the above structured optical fiber (see, for example, Patent Literature 1). According to the Patent Literature 1, it has been reported that an average refractive index of the cladding region can be greatly reduced by providing a microstructure, which is formed by arranging a plurality of holes in the glass of the cladding region, in a longitudinal direction. In other words, the optical fiber having the above microstructure can dramatically increase an effective refractive index of the core region compared to the conventional optical fiber.

Given this situation, in recent years, a microstructured optical fiber has been a focus of constant attention, in which a hole or the like is formed in a surrounding area of the core region of an optical fiber having a refractive index profile structure equivalent to a typical single mode optical fiber (SMF). For instance, it has been reported that a macro-bending loss against a small-diameter bending with a diameter of 15 mm (macro-bending loss r=15 mm) could be lowered to 0.04 dB/m by adopting the microstructure (see, for example, Nonpatent Literature 1). After that, there has been another report that the macro-bending loss could be further lowered up to below 0.01 dB/m (see, for example, Nonpatent Literature 2). On the other hand, an optical fiber has been proposed, in which the macro-bending loss is lowered while maintaining a large mode field diameter (MFD) in view of connection with the conventional SMF (see, for example, Patent Literature 2).

The optical fiber described in the Patent Literature 2 includes a microstructure in which a hexagonal lattice array of sub-medium region is formed in multilayer in the cladding region placed on a circumference of the core region. In other words, the optical fiber has a microstructure in which the sub-medium region is formed in multilayer at six folds rotationally symmetric centering on the core region. The sub-medium region is composed of an air, a liquid, or a glass filling each of the holes formed in the hexagonal lattice array in multilayer in the cladding region, having a refractive index lower than that of a main medium of the cladding region.

The microstructure in which the sub-medium region is formed in multilayer at the six folds rotational symmetry (hereinafter, "microstructure of the six folds rotational symmetry") is effective as a structure for an optical fiber that lowers the macro-bending loss, propagating a signal light of a predetermined wavelength band in a single mode.

Patent Literature 1: Japanese Patent No. 3306847
Nonpatent Literature 1: T. Hasegawa, et al., Microoptics Conference (2003), K2
Nonpatent Literature 2: Daizo Nishioka, et al., Shingaku Giho, OFT 2003 63, P. 23
Patent Literature 2: Japanese Patent Application Laid-Open No. 2004 220026

DISCLOSURE OF INVENTION

Problem to be Solved by the Invention

However, in the conventional microstructured optical fiber described above, it is necessary to form the multiple sub-medium regions or holes in the cladding region in a very dense state to propagate a light in a single mode while lowering the macro-bending loss against a bending with a small bending diameter (small-diameter bending). Because a sophisticated technology is required to form the sub-medium region or the hole in a very dense state, it is difficult to stably manufacture the microstructured optical fiber that can propagate a light in a single mode while lowering the macro-bending loss against the small-diameter bending.

The present invention is made in consideration of the above problems, and it is an object of the present invention to easily realize the optical fiber that can propagate a light in a single mode while lowering the macro-bending loss against the small-diameter bending. Another object of the present invention is to offer an optical transmission medium that can transmit a light in a single mode while lowering the macro-bending loss even when a small-diameter bending is build up against an optical fiber.

Means for Solving Problem

To solve the above problems, and to achieve the object, an optical fiber according to the present invention includes a core region and a cladding region. The cladding region includes a first cladding region on outer circumference of the core region, the first cladding region consisting of a main-medium region and a sub-medium region having a refractive index lower than a refractive index of the main-medium region. The sub-medium region includes a plurality of inner sub-medium regions arranged along the outer circumference of the core region and a plurality of outer sub-medium regions arranged on outer side of the inner sub-medium regions along the outer circumference of the core region. The outer sub-medium regions have a lateral cross section larger than a lateral cross section of the inner sub-medium regions.

Furthermore, in the optical fiber according to the present invention, a center of each lateral cross section of the outer sub-medium regions is located in a region sandwiched by lines formed by connecting a center of each lateral cross section of the inner sub-medium regions adjacent to each other and a center of a lateral cross section of the core region.

Moreover, in the optical fiber according to the present invention, the center of each lateral cross section of the inner sub-medium regions and the center of each lateral cross section of the outer sub-medium regions are respectively located in a concentric manner centering on the center of the core region.

Furthermore, in the optical fiber according to the present invention, the inner sub-medium regions are respectively arranged at six folds rotationally symmetric centering on the core region, and the outer sub-medium regions are respectively arranged at six folds rotationally symmetric centering on the core region.

Moreover, in the optical fiber according to the present invention, a hole is formed at each position where the sub-medium region is arranged along a center axis of the core region, and the sub-medium region is composed of any one of a gaseous substance, a liquid, and a solid substance that fills inside of the hole.

Furthermore, in the optical fiber according to the present invention, the cladding region includes a second cladding region on outer circumference of the first cladding region, the second cladding region being homogeneous, and a relative refractive index difference between the core region and the second cladding region is equal to or larger than 0.3% and equal to or smaller than 0.4%.

Moreover, in the optical fiber according to the present invention, a medium of the second cladding region is a pure silica glass.

Furthermore, in the optical fiber according to the present invention, a medium of the second cladding region is a fluorine-doped silica glass.

Moreover, in the optical fiber according to the present invention, a medium of the second cladding region is same a medium that forms the main-medium region of the first cladding region.

Furthermore, in the optical fiber according to the present invention, the core region is formed by a silica glass doped with at least one of germanium and phosphor.

Moreover, the optical fiber according to the present invention propagates a light having a wavelength of equal to or longer than 1500 nm in a single mode.

Furthermore, the optical fiber according to the present invention propagates a light having a wavelength of equal to or longer than 1280 nm in a single mode.

Moreover, in the optical fiber according to the present invention, a mode field diameter at a wavelength of 1550 nm is equal to or larger than 6 μm and equal to or smaller than 11 μm, and a macro-bending loss with a curvature radius of 7.5 mm at the wavelength of 1550 nm is equal to or less than 0.1 dB/m.

Furthermore, in the optical fiber according to the present invention, a macro-bending loss with a curvature radius of 5.0 mm at a wavelength of 1550 nm is equal to or less than 0.1 dB/m.

Moreover, an optical transmission medium according to the present invention includes any one of the optical fibers described above, in a condition in which the optical fiber is bent with a curvature radius of equal to or larger than 3 mm and equal to or smaller than 60 mm.

Furthermore, in the optical transmission medium according to the present invention, the optical fiber is in a condition in which the optical fiber is rolled in a coil with the curvature radius of equal to or larger than 3 mm and equal to or smaller than 60 mm.

Moreover, in the optical transmission medium according to the present invention, the optical fiber is connected to other optical fiber in a condition in which an end of the sub-medium region formed in the cladding region along the center axis of the core region is closed.

Furthermore, in the optical transmission medium according to the present invention, the end of the sub-medium region is sealed by filling a predetermined filling agent in the end of the sub-medium region.

Moreover, in the optical transmission medium according to the present invention, the end of the sub-medium region is closed by collapsing the end of the sub-medium region.

EFFECT OF THE INVENTION

According to the present invention, it is possible to reduce the number of sub-medium regions to be arranged in the cladding region to confine a fundamental mode alone in the core region and to lower the macro-bending loss against the small-diameter bending. Therefore, a microstructure in which a group of sub-medium regions is arranged in multilayer can be easily formed in the cladding region, and as a result, there is an effect that it is possible to increase manufacturability and to realize an optical fiber that can transmit a light in single mode while lowering the macro-bending loss against a small-diameter bending. In addition, by using the optical fiber according to the present invention, there is an effect that it is possible to easily realize an optical transmission medium that can transmit a light in a single mode while lowering the macro-bending loss even when a bending portion with a small diameter is build up against the optical fiber.

BRIEF DESCRIPTION OF DRAWINGS

FIG. 3 is a table of characteristics of a sample as a first embodiment example of the optical fiber according to the present invention;

FIG. 4 is a table of characteristics of samples as a second embodiment example of the optical fiber according to the present invention;

FIG. 5 is a table of characteristics of samples as a third embodiment example of the optical fiber according to the present invention;

EXPLANATIONS OF LETTERS OR NUMERALS

Figure 1:
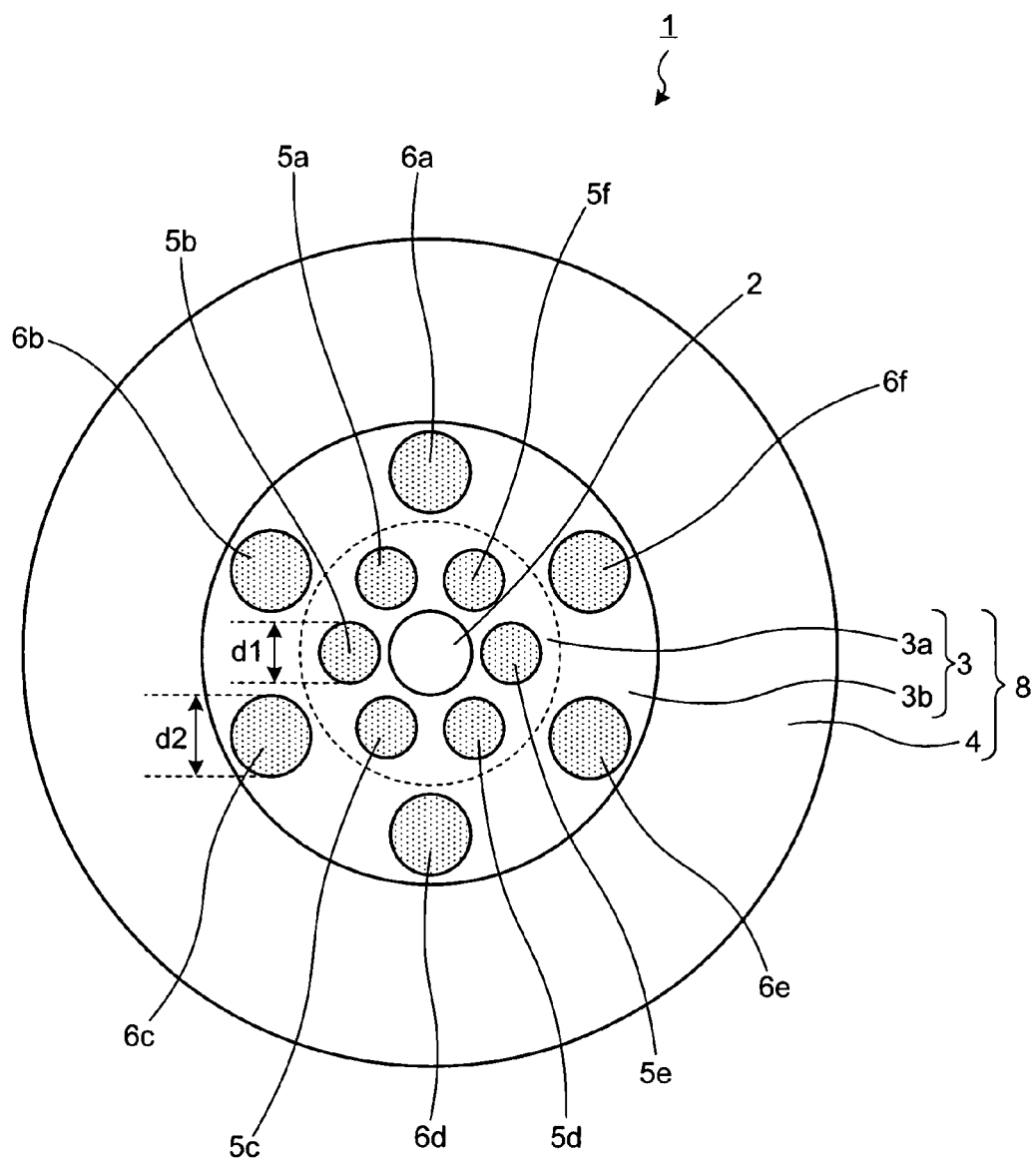
FIG. 1 is a lateral cross section of an example of an optical fiber according to an embodiment of the present invention.

1 Optical fiber
2 Core region
3 First cladding region
3a Inner cladding area
3b Outer cladding area
4 Second cladding region
5a to 5f, 6a to 6f Sub-medium regions
7a Hole
8 Cladding region
9 Sealed region
11 Refractive-index matching agent
20, 30 Optical transmission medium
101, 102 Backbone system optical fiber
103 Core region
110 Obstacle B1, B2 Bending portion
C1, C2 Connecting portion

BEST MODE(S) FOR CARRYING OUT THE INVENTION

Exemplary embodiments of an optical fiber and an optical transmission medium according to the present invention will be explained in detail below with reference to the accompanying drawings. The embodiments according to the present invention are mere examples of embodying the present invention, and do not limit the technical scope of the present invention.

Embodiment

An optical fiber according to an embodiment of the present invention will be explained first. FIG. 1 is a lateral cross section of an example of the optical fiber according to the embodiment of the present invention. An optical fiber 1 according to the embodiment is a microstructured optical fiber having a plurality of sub-medium regions arranged in a cladding region 8. As shown in FIG. 1, the optical fiber 1 includes a core region 2 through which a light propagates, a first cladding region 3 in which a plurality of sub-medium regions 5a to 5f and a plurality of sub-medium regions 6a to 6f are arranged, and a second cladding region 4 formed with a substantially homogeneous medium. In such a manner, the cladding region 8 includes the first cladding region 3 and the second cladding region 4. The core region 2, the first cladding region 3, and the second cladding region 4 are sequentially arranged in a concentric manner from a center axis of the optical fiber 1 in a longitudinal direction (i.e., a center of a lateral cross section of the optical fiber 1) toward outside.

The core region 2 is formed with, for example, a silica glass doped with a dopant to increase the refractive index, and is arranged substantially at the center of the lateral cross section of the optical fiber 1 (i.e., on the center axis of the optical fiber 1 in the longitudinal direction). The core region 2 serves as a propagation channel for a light. In addition, by forming the core region 2 that is doped with a dopant to increase the refractive index, it is possible to reduce a transmission loss of the light propagating through the core region 2. The core region 2 doped with such a dopant has a relative refractive index difference $\Delta n1$ of equal to or larger than 0.3% and equal to or smaller than 0.4% with respect to the second cladding region 4. The dopant to be doped in the medium of the core region 2 includes, for example, at least one of germanium (Ge) and phosphorus (P).

In a standard SMF used for the propagation channel for a light, the relative refractive index difference $\Delta n1$ between the core region and the cladding region is typically equal to or larger than 0.3% and equal to or less than 0.4%. At this moment, when the core region of the SMF is doped with germanium, the mol concentration of germanium is about 3 mol % to 4 mol %. In the core region 2 of the optical fiber 1 to be connected to such a standard SMF, it is preferable to dope germanium of the same mol concentration as that for the core region of the SMF. This will allow the relative refractive index difference $\Delta n1$ of the core region 2 to the second cladding region 4 to be set to equal to or larger than 0.3% and equal to or less than 0.4%, as in the case of the SMF. As a result, it becomes possible to reduce a connection loss between the SMF and the optical fiber 1.

With regard to the relative refractive index difference $\Delta n1$ of the core region 2 (relative refractive index difference of the core region 2 to the second cladding region 4), it is desirable to set the value to equal to or larger than 0.3% and equal to or less than 0.4% in any case whether the medium of the second cladding region 4 is a pure silica glass or is a fluorine-doped silica glass. Because it will allow to obtain an MFD at a end portion of the optical fiber 1 equivalent to an MFD of the standard SMF by removing the sub-medium region of the end portion of the optical fiber 1 (or by substituting the sub-medium region of the end portion of the optical fiber 1 with a predetermined refractive-index matching agent). As a result, it becomes possible to reduce a connection loss between the optical fiber 1 and the standard SMF.

The relative refractive index difference $\Delta n1$ (%) is defined by Equation (1) using the maximum refractive index of the core region 2 $n_{core}$ and the refractive index of the second cladding region 4 $n_{clad}$.

$$\Delta n1 = \{(n_{core} - n_{clad})/n_{core}\} \times 100 \tag{1}$$

The first cladding region 3 has a microstructure in which a plurality of sub-medium regions is arranged. The first cladding region 3 is arranged at an outer circumference of the core region 2, consisting of a main-medium region having a refractive index lower than the refractive index of the core region 2 and a plurality of sub-medium regions having a refractive index lower than the refractive index of the main-medium region. Upon dividing the first cladding region 3 into an inner cladding area 3a and an outer cladding area 3b in a concentric manner centering on the core region 2 (see FIG. 1), the first cladding region 3 includes the sub-medium regions 5a to 5f in the inner cladding area 3a, and the sub-medium regions 6a to 6f in the outer cladding area 3b. In this case, the inner cladding area 3a is an inner side area that is inside the first cladding region 3 along the outer circumference of the core region 2, and the outer cladding area 3b is an outer side area that is inside the first cladding region 3 along an outer circumference of the inner cladding area 3a. In this manner, the first cladding region 3 has a microstructure in which the sub-medium regions 5a to 5f and the sub-medium regions 6a to 6f are arranged in multilayer in a radial direction. Furthermore, the inner cladding area 3a and the outer cladding area 3b can also be arranged to be overlapped each other.

The main medium of the first cladding region 3 is, for example, a pure silica glass or a fluorine-doped silica glass. The pure silica glass described above means a silica glass that is not doped with a substance that is doped for a purpose of changing the refractive index (for example, Ge, F, etc.), and may contain $Cl_2$ or the like.

The sub-medium regions 5a to 5f are arranged at six folds rotationally symmetric centering on the core region 2 in the inner cladding area 3a. In this case, the sub-medium regions 5a to 5f are circular shaped with a lateral cross section of a diameter d1, and arranged along the core region 2 in the longitudinal direction. On the other hand, the sub-medium regions 6a to 6f are arranged at six folds rotationally symmetric centering on the core region 2 in the outer cladding area 3b. In this case, the sub-medium regions 6a to 6f are circular shaped with a lateral cross section of a diameter d2, and arranged along the core region 2 in the longitudinal direction. The diameter d2 of the lateral cross section of each of the sub-medium regions 6a to 6f is larger than the diameter d1 of the lateral cross section of each of the sub-medium regions 5a to 5f. In other words, the lateral cross section of each of the sub-medium regions 6a to 6f is larger than the later cross section of each of the sub-medium regions 5a to 5f.

The sub-medium regions 5a to 5f and the sub-medium regions 6a to 6f are made of a medium having a refractive index lower than the refractive index of the main-medium region of the first cladding region 3, such as a liquid, a gaseous substance (e.g., air), or a solid substance that fills inside of a hole formed in the first cladding region 3.

The holes on the inner side for providing the sub-medium regions 5a to 5f are circular shaped with a lateral cross section of a diameter d1, and arranged at the six folds rotationally symmetric centering on the core region 2 in the inner cladding area 3a. On the other hand, the holes on the outer side for providing the sub-medium regions 6a to 6f are circular shaped with a lateral cross section of a diameter d2 (>d1), and arranged at the six folds rotationally symmetric centering on the core region 2 in the outer cladding area 3b. The holes on the inner side or on the outer side are substantially parallel to the center axis of the core region 2 in the longitudinal direction (i.e., the center axis of the optical fiber 1 in the longitudinal direction). An area ratio of the lateral cross section of each of the holes on the inner side and on the outer side to the later cross section of the optical fiber 1 is equal to or smaller than 10%. The sub-medium regions 5a to 5f consist of a medium filling the inside of each of the holes on the inner side, and the sub-medium regions 6a to 6f consist of a medium filling the inside of each of the holes on the outer side.

With the first cladding region 3 having such a microstructure in which a plurality of sub-medium regions is arranged in multilayer, an average refractive index can be greatly decreased, compared to a case in which the main medium of the pure silica glass is used only. As a result, it is possible to set a relative refractive index difference between the core region 2 and the first cladding region 3 to a considerably larger value with ease. In this case, in consideration of an optical transmission in a single mode with a reduction of the macro-bending loss, the sub-medium regions 5a to 5f and the sub-medium regions 6a to 6f are arranged by optimizing the diameters d1 and d2 of the lateral cross sections (i.e., the diameters of the holes) and a distance between a location of the center of the lateral cross section (i.e., a location of a center axis of the hole) and the center of the lateral cross section of the core region 2 (hereinafter, "center-to-center distance"). In this manner, a proportion of the whole lateral cross section of the sub-medium regions 5a to 5f to the lateral cross section of the inner cladding area 3a and a proportion of the whole lateral cross section of the sub-medium regions 6a to 6f to the lateral cross section of the outer cladding area 3b are optimized.

For instance, because the sub-medium regions 6a to 6f arranged in the outer cladding area 3b are located at positions far from the center of the core region 2 in the radial direction compared to the sub-medium regions 5a to 5f on the inner side, the diameter d2 is set to a larger value in proportional to an increase of a difference in the center-to-center distances L1 and L2, and each of the lateral cross sections is made larger compared to the sub-medium regions 5a to 5f. In this manner, the proportion of the whole lateral cross section of the sub-medium regions 6a to 6f to the lateral cross section of the outer cladding area 3b is optimized.

Specifically, to obtain an optical confinement effect equivalent to that of an optical fiber having a conventional microstructure of the six folds rotational symmetry, the diameter d2 of the lateral cross section of the sub-medium regions 6a to 6f is determined in such a manner that a sum of lateral cross sections of sub medium group arranged in the outer cladding area of the cladding region of the optical fiber having the conventional microstructure of the six folds rotational symmetry becomes substantially same as a sum of the lateral cross sections of the sub-medium regions 6a to 6f. The outer cladding area of the conventional optical fiber is an area on the outer side with respect to an area in which a first layer sub-medium region is formed along the outer circumference of the core region. By setting the diameter d2 as describe above, the optical fiber 1 can confine a fundamental mode of a propagating light (hereinafter, "fundamental mode") in the core region 2 as in the case of the optical fiber having the conventional microstructure of the six folds rotational symmetry, and at the same time, can leak a higher-order mode of the propagating light (hereinafter, "higher-order mode") to outside (i.e., eliminate the higher-order mode).

In addition, the optical fiber 1 can make the lateral cross section of the sub-medium regions arranged in the outer cladding area 3b larger compared to the conventional optical fiber, and at the same time, can reduce the number of the sub-medium regions to be arranged in the outer cladding area 3b compared to the conventional optical fiber. With this scheme, the microstructure of the optical fiber 1 can be easily implemented compared to the conventional optical fiber, and as a result, it is possible to manufacture the optical fiber 1 with ease compared to the conventional optical fiber.

Furthermore, the optical fiber having the conventional microstructure necessitates an increase of the number of sub-medium regions to be arranged in each layer as the location of arranging the sub medium group gets away from the center of the core region in the radial direction, to optimize a proportion of the whole lateral cross section of the sub medium group to the lateral cross section of each layer in the cladding region for every layer. However, it is difficult to form multiple holes of a small diameter in the cladding region because a location of forming the hole and the diameter of the hole must be controlled with a high accuracy. Therefore, in most cases, it is difficult to arrange the sub-medium regions by forming the multiple holes with a high accuracy in manufacturing the optical fiber. In other words, the optical fiber having the conventional microstructure is hard to manufacture because the multiple holes of a small diameter must be formed to arrange the sub-medium regions in the cladding region with a high accuracy.

The second cladding region 4 is a homogeneous layer formed with a predetermined medium, and is arranged at the outer circumference of the first cladding region 3. In this case, it is desirable that the medium of the second cladding region 4 should be a medium having a refractive index lower than that of the core region 2 consisting of, for example, the pure silica glass or the fluorine-doped silica glass, as in the case of the first cladding region 3. As a result, the second cladding region 4 can cause a refractive index difference with respect to the core region 2.

Furthermore, a coating portion (not shown) having a flexibility is arranged in a concentric manner at the outer circumference of the second cladding region 4. The coating portion prevents a damage and a strength degradation of the optical fiber 1, and at the same time, prevents optical transmission characteristics of the optical fiber 1 from degrading by a strain caused by an external force (stress) applied to the inside of the optical fiber 1.

Figure 2:
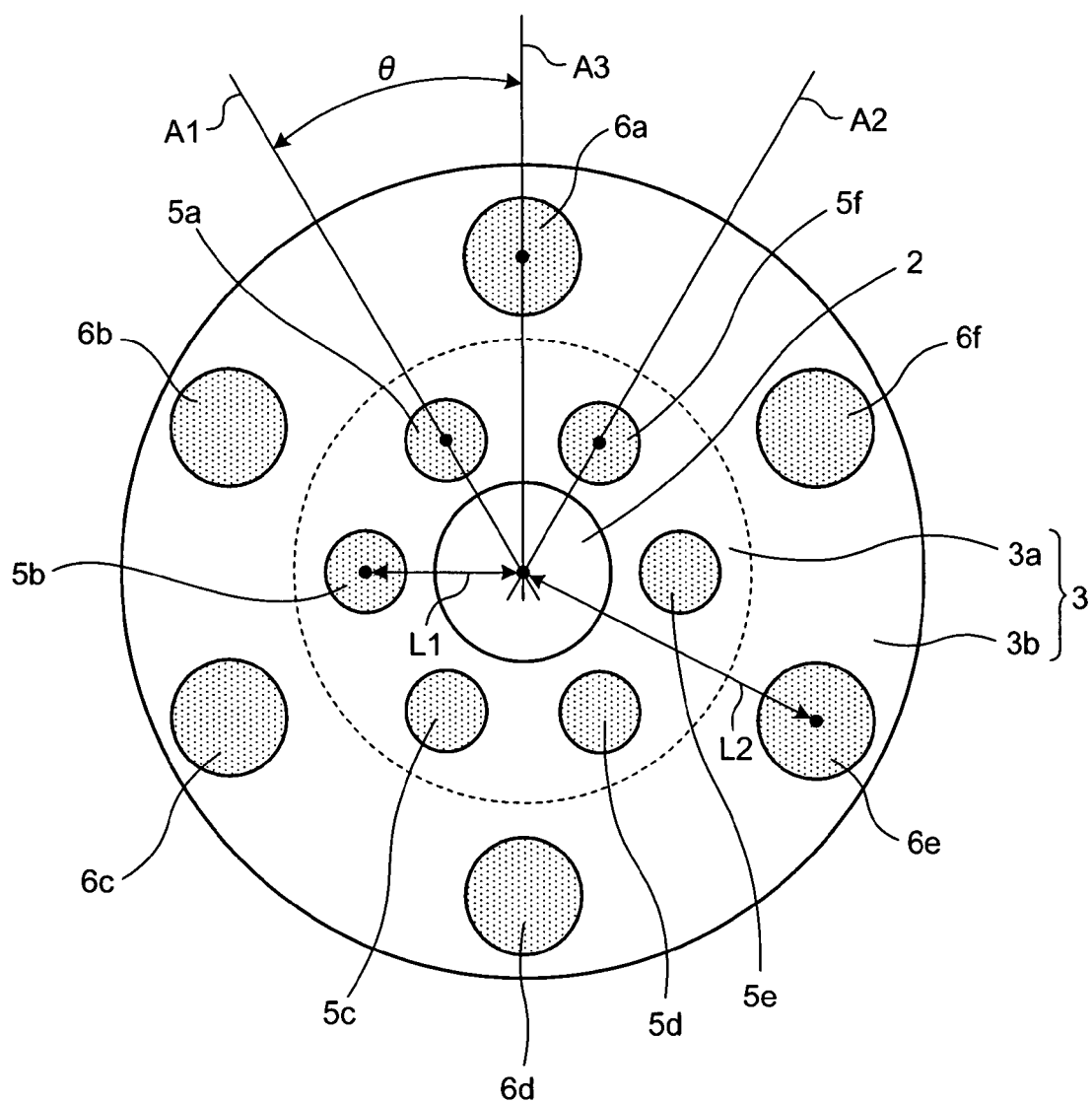
FIG. 2 is a lateral cross section of the optical fiber, illustrating an example of arranging an inner sub-medium region and an outer sub-medium region arranged in multilayer in a cladding region.

An arrangement of the sub-medium regions 5a to 5f and the sub-medium regions 6a to 6f in the first cladding region 3 will be explained below. FIG. 2 is a lateral cross section of the optical fiber 1, illustrating an example of arranging the sub-medium regions 5a to 5f on the inner side and the sub-medium regions 6a to 6f on the outer side in the first cladding region 3. As shown in FIG. 2, the sub-medium regions 5a to 5f are respectively arranged at six folds rotationally symmetric centering on the core region 2 in the inner cladding area 3a. The sub-medium regions 6a to 6f are respectively arranged at six folds rotationally symmetric centering on the core region 2 in the outer cladding area 3b.

When the sub-medium regions are arranged at each of the six folds rotational symmetry in the first cladding region 3, the centers of the lateral cross sections of the sub-medium regions are located at each vertex of similar equilateral hexagons having a center of the lateral cross section of the core region 2 as a common center (i.e., on each circumference of the concentric circles having the core region 2 as the common center), respectively. Specifically, each center of the lateral cross section of the sub-medium regions 5a to 5f is located at each vertex of the equilateral hexagon formed in the inner cladding area 3a having a center at the core region 2. Likewise, each center of the lateral cross section of the sub-medium regions 6a to 6f is located at each vertex of the equilateral hexagon formed in the outer cladding area 3b having a center at the core region 2. In this case, each center of the lateral cross section of the sub-medium regions 5a to 5f is located on a circumference of a circle having a center on the core region 2 and a radius of the center-to-center distance L1 between the lateral cross section of the core region 2 and each lateral cross section of the sub-medium regions 5a to 5f. On the other hand, each center of the lateral cross section of the sub-medium regions 6a to 6f is located on a circumference of a circle having a center on the core region 2 and a radius of the center-to-center distance L2 (>L1) between the lateral cross section of the core region 2 and each lateral cross section of the sub-medium regions 6a to 6f.

In this manner, since the center of each lateral cross section of the sub-medium regions 5a to 5f, 6a to 6f is located on each circumference of the concentric circle, the sub-medium regions 5a to 5f, 6a to 6f can be easily arranged at each of the six folds rotational symmetry in the first cladding region 3. As a result, it is possible to enhance a manufacturing (manufacturability) of the optical fiber 1 according to the present invention.

Furthermore, the center of each lateral cross section of the sub-medium regions 6a to 6f is located in a region sandwiched by lines formed by connecting the center of each lateral cross section of the sub-medium regions 5a to 5f adjacent to each other and the center of the lateral cross section of the core region 2. The region where the center of each lateral cross section of the sub-medium regions 6a to 6f is located is a partial area of the outer cladding area 3b sandwiched by the lines.

For instance, the center of the lateral cross section of the sub-medium region 6a is located in a partial area of the outer cladding area 3b sandwiched by lines A1 and A2 that respectively pass the centers of the lateral cross sections of the sub-medium regions 5a and 5f adjacent to each other from among the sub-medium regions 5a to 5f and the center of the lateral cross section of the core region 2. In this case, although the center of the lateral cross section of the sub-medium region 6a can be located on the line A1 or on the line A2, it is desirable that it is located in the partial area sandwiched by the lines A1 and A2. In other words, an angle θ that is formed by the line A1 and a line A3 that passes the center of the lateral cross section of the sub-medium region 6a and the center of the lateral cross section of the core region 2 can be 0 degree or 60 degrees; however, it is desirable that the angle θ should be any value in a range between 0 degree and 60 degrees. Furthermore, it is preferable that the angle θ should be equal to or larger than 20 degrees and equal to or smaller than 40 degrees. The same goes for the rest of the sub-medium regions 5b to 5f on the inner side and the sub-medium regions 6b to 6f on the outer side.

When the angle θ is equal to or larger than 20 degrees and equal to or smaller than 40 degrees, the sub-medium regions 6a to 6f on the outer side having the six folds rotationally symmetric relation will be located in opposite to the core region 2 having a boundary of the main medium between each of the sub-medium regions 5a to 5f on the inner side. By setting the positional relation between the sub-medium regions 5a to 5f on the inner side and the sub-medium regions 6a to 6f on the outer side, it is possible to reduce a dependency of the macro-bending loss on a bending direction of the optical fiber 1. As a result, with the optical fiber 1 in which the positional relation is set as describe above, it is possible to reduce the macro-bending loss to a desired value against a small-diameter bending in all bending directions, being independent of the bending direction. In addition, by setting the positional relation of the sub-medium regions as describe above, a space between the sub-medium regions on the inner side and the sub-medium regions on the outer side can be increased. As a result, because the sub-medium regions 5a to 5f, 6a to 6f can be easily arranged in the first cladding region 3 (i.e., it becomes easy to form the holes for arranging the sub-medium regions), the manufacturability of the optical fiber 1 can be further enhanced.

With the first cladding region 3 in which a plurality of sub-medium regions (for example, the sub-medium regions 5a to 5f on the inner side and the sub-medium regions 6a to 6f on the outer side) are arranged in multilayer as described above, it is possible to obtain an extremely strong confinement of a light in the core region 2. In other words, with the optical fiber 1 including the first cladding region 3, even when a small-diameter bending (for example, a bending with a curvature radius of equal to or larger than 3 mm and equal to or smaller than 60 mm) is formed, it is possible to lower a leakage of a light to the first cladding region 3. As a result, the macro-bending loss can be reduced against the small-diameter bending of the optical fiber 1.

Although the sub-medium regions forming the microstructure of the optical fiber 1 can be arranged a predetermined number folds rotational symmetry, such as three or four, instead of the six folds rotational symmetry described above, it is preferable that the sub-medium regions should be arranged at the six folds rotational symmetry. Because the effect of confining the fundamental mode by the sub-medium regions in the inner cladding area 3a is stronger when the sub-medium regions are arranged at the six folds rotational symmetry in multilayer in the first cladding region 3, a cut off wavelength of the optical fiber 1 can be easily adjusted by adjusting the diameter or the center position of the sub-medium regions in the outer cladding area 3b.

Furthermore, a confinement of a higher-order mode light in the core region 2 can be lowered while maintaining the confinement effect of the fundamental mode light in the core region 2 by optimizing the multilayer arrangement of the sub-medium regions 5a to 5f, 6a to 6f in the first cladding region 3. As a result, it is possible to leak the higher mode to the cladding region while confining the fundamental mode in the core region 2. In other words, with the optical fiber 1 including the first cladding region 3, it is possible to transmit a light in a single mode (waveguide the fundamental mode alone), and at the same time, to lower the macro-bending loss against the small-diameter bending.

Specifically, the optical fiber 1 having the structure described above can transmit a light in a wavelength band of, for example, equal to or longer than 1500 nm in a single mode. Therefore, the optical fiber 1 can transmit the light the wavelength band including a C band and L band. In addition, when transmitting a light having a wavelength of 1550 nm in a single mode, the optical fiber 1 has an MFD of equal to or larger than 6 μm and equal to or smaller than 11 μm, being able to decrease the macro-bending loss against a small-diameter bending with a curvature radius r of 7.5 mm to equal to or lower than 0.1 dB/m.

With the optical fiber 1 described above, it is possible to realize a transmission of a light of a shorter wavelength and a decrease of the macro-bending loss against an even smaller diameter bending, and the like, by properly adjusting parameters according to the usage, such as the relative refractive index difference $\Delta n1$, each of the diameters d1 and d2 of the sub-medium regions 5a to 5f, 6a to 6f (i.e., the diameter of each of the holes), the center-to-center distances L1 and L2, or the like.

The transmission of the light in a single mode is defined by a fact that the cut off wavelength $\lambda c$ is shorter than an operating wavelength (a wavelength of the transmitting light). The cut off wavelength $\lambda c$ indicates the fiber cut off wavelength defined by the ITU-T (International Telecommunication Union-Telecommunication Standardization Sector) G.650.1.1. As for the rest of terminologies not specifically defined in the specification, the definition and the measurement method by the ITU-T G.650.1 or G.650.2 will be applied.

The optical fiber 1, which operates as a single mode fiber that can lower the macro-bending loss against the small-diameter bending as described above, can be installed in a local place along a wall or a pillar of an indoor, a building, or the like with a small curvature radius. Specifically, the optical fiber 1 can transmit a light in a wavelength band of equal to or longer than 1550 nm in a single mode while decreasing the macro-bending loss against the small-diameter bending to equal to or lower than 0.1 dB/m, even when the optical fiber 1 is installed in a condition in which the small-diameter bending with the curvature radius of equal to or larger than 3 mm and equal to or smaller than 60 mm is formed in more than one place. The same goes for a case in which the optical fiber 1 is rolled in a coil shape forming the small-diameter bending with the curvature radius of equal to or larger than 3 mm and equal to or smaller than 60 mm.

The macro-bending loss described above is further decreased as wavelength band of the light propagating through the optical fiber 1 becomes low. Therefore, the optical fiber 1 has the same effect when transmitting a light in a wavelength band of shorter than 1550 nm, for example, a wavelength band of equal to or longer than 1310 nm or a wavelength band of equal to or shorter than 1250 nm, as the case of transmitting the light in the wavelength band of equal to or longer than 1550 nm.

In addition, the optical fiber 1 having the MFD of equal to or larger than 6 µm and equal to or smaller than 11 µm can reduce a connection loss that occurs when connecting the optical fiber 1 to a standard SMF used in a light propagating channel (hereinafter, the standard SMF indicates a fiber corresponding to the ITU T G.652). It is because that the MFD of the standard SMF is about 10 µm at the wavelength of 1550 nm, and is close to the MFD of the optical fiber 1 (equal to or larger than 6 µm and equal to or smaller than 11 µm). In other words, when connecting the optical fiber 1 to the standard SMF, the connection loss can be reduced as a difference between the MFD of the standard SMF and the MFD of the optical fiber 1 approaches zero. The same goes for a case in which the standard SMF and the optical fiber 1 are fusion sliced.

By using the optical fiber 1 having the effect described above, it is possible to realize an optical transmission medium in a line shape or a coil shape, which can decrease the macro-bending loss against the small-diameter bending of equal to or larger than 3 mm and equal to or smaller than 60 mm to equal to or lower than 0.1 dB/m, and at the same time, can transmit a light in a wavelength of equal to or longer than 1250 nm in a single mode. Using the optical transmission medium, a waveguide or an optical device can be easily implemented, which can decrease the macro-bending loss against the small-diameter bending, and at the same time, can transmit the light in the wavelength of equal to or longer than 1250 nm in a single mode.

First Embodiment Example

A method of manufacturing the optical fiber 1 according to the embodiment of the present invention will be explained below, followed by a specific explanation of an embodiment example of the optical fiber 1 manufactured based on the method. The optical fiber 1 shown in FIG. 1 is manufactured based on the manufacturing method described below.

A core region is formed by doping a dopant in a silica glass by the VAD (vapor phase axial deposition) method or the MCVD (modified chemical vapor deposition) method, and a silica glass including the core region doped with the dopant is fabricated. In this case the dopant doped in the core region is at least one of germanium and phosphorous. In addition, the relative refractive index of the core region to the pure silica glass is adjusted to 0.37%.

According to the VAD method or the MCVD method, it is possible to make a fine adjustment of the amount of the dopant to be doped in the silica glass to form the core region. As a result, it is possible to adjust the relative refractive index difference $\Delta n1$ of the core region 2 with respect to the second cladding region 4 (e.g., a pure silica glass) included in the optical fiber 1 in steps of 0.01%.

After that, a pure silica glass layer is formed (externally) on the outer circumference of the silica glass including the core region by the OVD (outside vapor deposition) method. With the above steps, a preform having an outer diameter of 53.33 mm and a core diameter of 5.0 mm is fabricated. In this case, the preform includes the core region and the pure silica glass portion sequentially formed in layer in a concentric manner from the center axis in the longitudinal direction toward the radial direction (outer side). The pure silica glass portion can be substituted with a fluorine-doped silica glass.

Subsequently, the silica glass portion of the preform is drilled using a mechanical drill such as an ultrasonic drill, to form a plurality of holes in the silica glass portion of the preform. In this case, the lateral cross section of the holes is substantially circular, and the holes are formed at the six folds rotational symmetry along the center axis of the core region as shown in FIG. 2. Specifically, the holes are formed one by one in parallel to the core region at each of the six folds rotational symmetry centering on the core region (each of the points corresponding to the sub-medium regions 5a to 5f shown in FIG. 2) in the silica glass portion near the outer circumference of the core region of the preform. Subsequently, the holes are formed one by one in parallel to the core region at each of the six folds rotational symmetry centering on the core region (each of the points corresponding to the sub-medium regions 6a to 6f) in the silica glass portion on the outer side of the silica glass portion where the six holes have been formed. In this case, each of the holes on the inner side is formed such that the finishing diameter becomes 2 mm, and each of the holes on the outer side is formed such that the finishing diameter becomes 5.33 mm. After forming the holes, a surface of the inner wall of each of the holes on the inner side and the outer side is polished.

The preform is drawn while flowing a predetermined gas into each of the holes on the inner side and the outer side, to form an optical fiber having a predetermined outer diameter. A pressure inside each of the holes formed in the preform is adjusted by flowing the predetermined gas into the holes. In this manner, the diameters of the holes on the inner side and the outer side are adjusted to the predetermined diameters d1 and d2, respectively, with the drawing. Specifically, the preform is drawn such that the outer diameter of the fiber (i.e., the outer diameter of the silica glass portion formed on the outer circumference of the core region) becomes 80 μm. In this manner, a sample #1 is fabricated, which is a first embodiment example of the optical fiber 1 according to the embodiment of the present invention.

The sample #1 according to the first embodiment example has the same structure as the optical fiber 1 described above (see FIGS. 1 and 2). Specifically, the core region 2 of the sample #1 has a diameter of the lateral cross section (i.e., core diameter) of 7.5 μm and the relative refractive index difference Δn1 of 0.37% with respect to the second cladding region 4. In addition, the sub-medium regions 5a to 5f on the inner side and the sub-medium regions 6a to 6f on the outer side arranged in the first cladding region 3 of the sample #1 consist of a gaseous substance (e.g., air) that fills an internal space of the holes, with the lateral cross section (i.e., the lateral cross section of the holes) substantially circular. In this case, the diameter d1 of each lateral cross section of the sub-medium regions 5a to 5f on the inner side (i.e., the diameter of the holes on the inner side) is 3 μm, and the diameter d2 of each lateral cross section of the sub-medium regions 6a to 6f on the outer side (i.e., the diameter of the holes on the outer side) is 8 μm.

The center-to-center distance L1 between the sub-medium regions 5a to 5f on the inner side and the core region 2 of the sample #1 is 6.0 μm. The center of each lateral cross section of the sub-medium regions 5a to 5f on the inner side is located on the circumference of a circle centering on the core region 2 with a radius of the center-to-center distance L1. In this case, an interval between adjacent sub-medium regions among the sub-medium regions 5a to 5f on the inner side is 6 μm. For instance, an interval between the center of the lateral cross section of the sub-medium region 5a and the center of the lateral cross section of the sub-medium region 5b shown in FIG. 2 is 6 μm.

On the other hand, the center-to-center distance L2 between the sub-medium regions 6a to 6f on the outer side and the core region 2 of the sample #1 is 13.15 μm. The center of each lateral cross section of the sub-medium regions 6a to 6f on the outer side is located on the circumference of a circle centering on the core region 2 with a radius of the center-to-center distance L2, i.e., a circle with a radius of the center-to-center distance L2 concentric with the circle connecting the center of each lateral cross section of the sub-medium regions 5a to 5f on the inner side. In this case, an interval between adjacent sub-medium regions among the sub-medium regions 6a to 6f on the outer side is 13.15 μm. For instance, an interval between the center of the lateral cross section of the sub-medium region 6a and the center of the lateral cross section of the sub-medium region 6b shown in FIG. 2 is 13.15 μm. An angle θ that is formed by a line that passes the center of each lateral cross section of the sub-medium regions 5a to 5f on the inner side and the center of the lateral cross section of the core region 2 (e.g., the line A1 or A2) and a line that passes the center of each lateral cross section of the sub-medium regions 6a to 6f on the outer side and the center of the lateral cross section of the core region 2 (e.g., a line A3) is 30 degrees.

The sample #1 with the above structure has characteristics, for example, shown in FIG. 3. As shown in FIG. 3, the cut off wavelength λc of the sample #1 is 1450 nm. Therefore, the sample #1 can transmit a light in a wavelength band of equal to or longer than 1450 nm, for example, a light in a wavelength band of 1.55 μm (1530 nm to 1565 nm) in a single mode. A polarization mode dispersion of the sample #1 is equal to or smaller than 0.1 ps/km$^{1/2}$.

When transmitting a light having a wavelength of 1550 nm, the sample #1 can reduce the macro-bending loss against a small-diameter bending with a curvature radius r=7.5 mm to 0.008 dB/m, and the macro-bending loss against a small-diameter bending with a curvature radius r=5.0 mm to 0.034 dB/m. As described above, the macro-bending loss against the small-diameter bending is equal to or smaller than 0.1 dB/m, with a considerably small increase of loss caused by the small-diameter bending.

When transmitting a light having a wavelength of 1550 nm, the sample #1 has the MFD of 6.82 μm. Since the sample #1 has the MFD close to the MFD of the standard SMF (about 10 μm), the sample #1 can reduce the connection loss caused when it is connected to the standard SMF (e.g., a mechanical connection using a mechanical splice or a fusion splice), and at the same time, can suppress the nonlinear phenomena occurring in the optical fiber. Specifically, when a end portion of each of the holes formed in the first cladding region 3 of the sample #1 is collapsed (i.e., the end portion of each of the holes is closed) by a thermal processing, and when the standard SMF is connected to the end portion of the sample #1 in a closed condition, the connection loss of the sample #1 and the standard SMF is equal to or smaller than 0.1 dB.

Although the preform with the outer diameter of 53.33 mm is drawn to be an optical fiber with a cladding diameter of 80 μm to fabricate the sample #1 according to the first embodiment example, the present invention is not limited to this scheme, but the sample #1 can be fabricated by changing the cladding diameter in a range between 50 μm and 150 μm according to the usage. For instance, when fabricating the sample #1 with the cladding diameter of 125 μm, the preform is fabricated with the outer diameter of 62.5 mm and the core diameter of 3.75 mm, based on the above manufacturing method, and a plurality of holes with a diameter of 1.5 mm and a plurality of holes with a diameter of 4 mm are formed in the silica glass portion of the preform. After that, by drawing the preform to be the optical fiber with the cladding diameter of 125 μm, the sample #1 having the cladding diameter of 125 μm can be fabricated. The sample #1 having the cladding diameter of 125 μm has virtually same characteristics as the sample #1 having the cladding diameter of 80 μm (see FIG. 3).

Second Embodiment Example

A second embodiment example of the optical fiber 1 according to the embodiment of the present invention will be explained below. According to the second embodiment example, samples #2 and #3 are explored, which are fabricated by increasing or decreasing the relative refractive index difference Δn1 of the sample #1 that is the first embodiment example of the optical fiber 1, based on the manufacturing method of the optical fiber 1 described above. In this case, the relative refractive index difference Δn1 is increased or decreased by changing a doping amount of germanium to be doped in the core region 2.

Specifically, the relative refractive index difference Δn1 of the sample #2 is set to a smaller value (Δn1=0.33%), compared to the sample #1 that is the first embodiment example, and the relative refractive index difference Δn1 of the sample #3 is set to a larger value (Δn1=0.40%), compared to the sample #1 that is the first embodiment example. Other than the relative refractive index difference Δn1, the samples #2 and #3 according to the second embodiment example have the same configuration as the sample #1 according to the first embodiment example.

The samples #2 and #3 according to the second embodiment example have characteristics, for example, shown in FIG. 4. As shown in FIG. 4, with the sample #2, it is possible to lower the cut off wavelength λc to 1400 nm by making the relative refractive index difference Δn1 smaller than that of the sample #1. With this scheme, the sample #2 can transmit a light in a wavelength band of equal to or longer than 1400 nm in a single mode. In addition, when transmitting a light having a wavelength of 1550 nm, the sample #3 can reduce the macro-bending loss against a small-diameter bending with a curvature radius r=7.5 mm to 0.019 dB/m, and the macro-bending loss against a small-diameter bending with a curvature radius r=5.0 mm to 0.069 dB/m.

On the other hand, with the sample #3, it is possible to further reduce the macro-bending loss against the small-diameter bending by making the relative refractive index difference Δn1 larger than that of the sample #1. Specifically, when transmitting a light having a wavelength of 1550 nm, the sample #3 can reduce the macro-bending loss against a small-diameter bending with a curvature radius r=7.5 mm to 0.004 dB/m, and the macro-bending loss against a small-diameter bending with a curvature radius r=5.0 mm to 0.019 dB/m. The cut off wavelength of the sample #3 is 1520 nm as shown in FIG. 4. Therefore, the sample #2 can transmit a light in a wavelength band of equal to or longer than 1520 nm.

In this manner, the samples #2 and #3 according to the second embodiment example can transmit a light in a wavelength band of equal to or longer than 1520 nm (for example, a light in a wavelength band of 1.55 μm (1530 nm to 1565 nm)) in a single mode, and at the same time, can reduce the macro-bending loss against a small-diameter bending with a curvature radius r=5.0 mm to 0.1 dB/m. In addition, when transmitting a light having a wavelength of 1550 nm, the samples #2 and #3 have the MFD comparable with that of the sample #1 according to the first embodiment example.

The samples #2 and #3 according to the second embodiment example can be fabricated by drawing (stretching process) the preform in such a manner that the cladding diameter becomes 50 μm to 150 μm, similar to the sample #1 according to the first embodiment example. The samples #2 and #3 with the cladding diameter changed have virtually same characteristics as the samples #2 and #3 having the cladding diameter of 80 μm (see FIG. 4).

Third Embodiment Example

A third embodiment example of the optical fiber 1 according to the embodiment of the present invention will be explained below. According to the second embodiment example, samples #4 to #15 are explored, which are fabricated by changing at least one of the relative refractive index difference Δn1, the diameter d2 (the diameter of the hole on the outer side), and the center-to-center distance L2 of the sample #1 that is the first embodiment example of the optical fiber 1, based on the manufacturing method of the optical fiber 1 described above.

Specifically, from among the samples #4 to #15, the relative refractive index difference Δn1 of the samples #5, #8, #11, and #14 is set to the same value (Δn1=0.37%) as that of the sample #1 that is the first embodiment example, the relative refractive index difference Δn1 of the samples #4, #7, #10, and #13 is set to a lower value (Δn1=0.33%), compared to the sample #1 that is the first embodiment example, and the relative refractive index difference Δn1 of the samples #6, #9, #12, and #15 is set to a higher value (Δn1=0.40%), compared to the sample #1 that is the first embodiment example.

Furthermore, each lateral cross section of the sub-medium regions 6a to 6f (i.e., the lateral cross section of each of the holes on the outer side formed in the first cladding region 3) of the samples #4 to #6 is reduced to about 88% of that of the sample #1 by reducing the diameter d2 to 7.5 μm. Similarly, each lateral cross section of the sub-medium regions 6a to 6f of the samples #7 to #9 is reduced to about 81% of that of the sample #1 by reducing the diameter d2 to 7.2 μm, and each lateral cross section of the sub-medium regions 6a to 6f of the samples #13 to #15 is reduced to about 77% of that of the sample #1 by reducing the diameter d2 to 7.0 μm. On the other hand, each lateral cross section of the sub-medium regions 6a to 6f of the samples #10 to #12 is enlarged to about 1.1 times that of the sample #1 by enlarging the diameter d2 to 8.3 μm.

In addition, the center-to-center distance L2 of the samples #4 to #9 is set to the same value (L2=13.15 μm) as that of the sample #1, the center-to-center distance L2 of the samples #10 to #12 is set to a larger value (L2=13.60 μm), compared to the sample #1, and the center-to-center distance L2 of the samples #13 to #15 is set to a smaller value (L2=12.90 μm), compared to the sample #1.

Other than the relative refractive index difference Δn1, the diameter d2, and the center-to-center distance L2, the samples #4 to #15 according to the third embodiment example have the same configuration as the sample #1 according to the first embodiment example.

Since the lateral cross sections of the sub-medium regions 6a to 6f (i.e., the lateral cross sections of the holes on the outer side formed in the first cladding region 3) of the samples #4 to #9 and #13 to #15 are reduced, the cut off wavelength λc can be shorter than that of the sample #1 according to the first embodiment example. Specifically, the cut off wavelength λc of the samples #4 to #6 can be lowered to equal to or shorter than 1400 nm, and the cut off wavelength λc of the samples #7 to #9 and #13 to #15 can be lowered to below 1400 nm. In other words, any one of the samples #4 to #9 and #13 to #15 can transmit a light in a wavelength band of equal to or longer than 1400 nm in a single mode. In this case, the cut off wavelength λc of the samples #4 to #9 and #13 to #15 can be lowered as the relative refractive index difference Δn1 becomes small. In particular, the cut off wavelengths λc of the samples #7 and #13 that have the relative refractive index difference Δn1 of 0.33% are 1250 nm and 1280 nm, respectively, which means that it can be lowered to below 1300 nm. Therefore, the samples #7 and #13 can transmit a light in a wavelength band of equal to or longer than 1280 nm, for example, a wavelength band of 1.3 μm (1280 nm to 1330 nm) and a wavelength band of 1.55 μm (1530 nm to 1565 nm) in a single mode.

Furthermore, when transmitting a light having a wavelength of 1550 nm, the samples #4 to #9 and #13 to #15 can reduce the macro-bending loss against a small-diameter bending with a curvature radius r=7.5 mm to equal to or smaller than 0.1 dB/m. In this case, the macro-bending loss of the samples #4 to #9 and #13 to #15 can be reduced as the relative refractive index difference Δn1 becomes large. In particular, when transmitting a light having a wavelength of 1550 nm, the samples #6 and #15 that have the relative refractive index difference Δn1 of 0.40% can reduce the macro-bending loss against a small-diameter bending with a curvature radius r=5.0 mm to equal to or smaller than 0.1 dB/m.

On the other hand, the samples #10 to #12 are fabricated by enlarging each of the lateral cross sections of the sub-medium regions 6a to 6f (i.e., the lateral cross section of each of the holes on the outer side formed in the first cladding region 3) so that the center-to-center distance L2 is increased according to the enlargement of the lateral cross section. Any one of the sample #10 to #13 fabricated as above can lower the cut off wavelength λc to below 1500 nm (specifically, to 1340 nm, 1410 nm, and 1460 nm, respectively). In other words, the samples #10 to #12 can transmit a light in a wavelength band of equal to or longer than 1460 nm, for example, a wavelength band of 1.55 μm (1530 nm to 1565 nm) in a single mode. In this case, the cut off wavelength λc of the samples #10 to #12 can be lowered as the relative refractive index difference Δn1 becomes small.

In addition, when transmitting a light having a wavelength of 1550 nm, the samples #10 to #12 can reduce the macro-bending loss against a small-diameter bending with a curvature radius r=7.5 mm to equal to or smaller than 0.1 dB/m. In particular, the samples #11 and #12 can reduce the macro-bending loss against a small-diameter bending with a curvature radius r=5.0 mm to equal to or smaller than 0.1 dB/m.

In this manner, it is clear that the parameters such as the relative refractive index difference Δn1, the diameter d2 of the sub-medium regions (or holes) on the outer side, and the center-to-center distance L2 have a large influence on the cut off wavelength λc and the macro-bending loss against the small-diameter bending of the optical fiber 1. Therefore, by properly adjusting the parameters according to the usage to optimize the relative refractive index difference Δn1, the lateral cross section of the sub-medium regions 6a to 6f on the outer side, and the center-to-center distance L2 from the core region 2, it is possible to diminish the optical confinement effect for the higher-order mode while maintaining the optical confinement effect for the fundamental mode, and at the same time, to reduce the macro-bending loss against the small-diameter bending. As a result, the cut off wavelength λc can be lowered to 1250 nm, and it is possible to manufacture the optical fiber 1 that can reduce the macro-bending loss against the small-diameter bending to equal to or smaller than 0.1 dB/m.

In addition, the samples #4 to #15 according to the third embodiment example can be fabricated by drawing (stretching process) the preform in such a manner that the cladding diameter becomes 50 μm to 150 μm, similar to the sample #1 according to the first embodiment example. The samples #4 to #15 with the cladding diameter changed have virtually same characteristics as the samples #4 to #15 having the cladding diameter of 80 μm (see FIG. 5).

Fourth Embodiment Example

Figure 6:
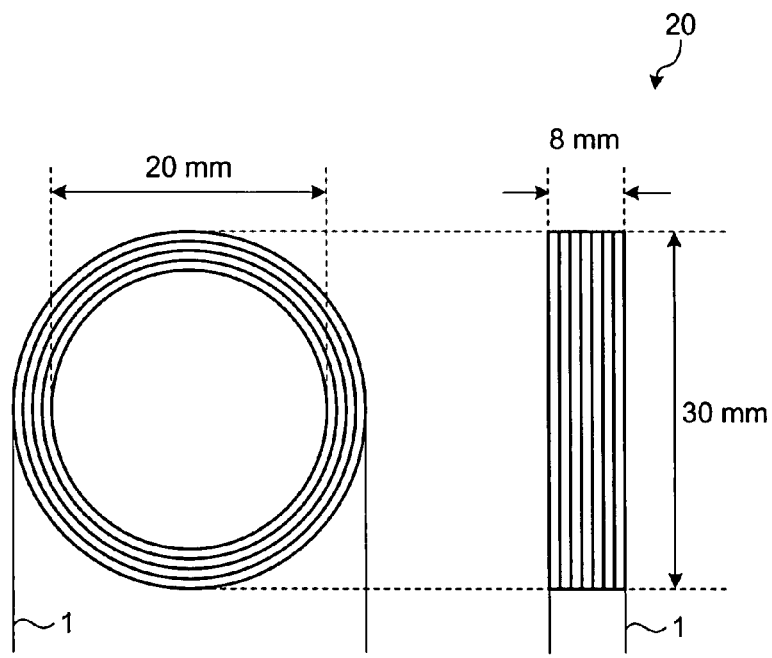
FIG. 6 is a schematic diagram illustrating an example of configuration of an optical transmission medium as a fourth embodiment example of the present invention.

An optical transmission medium according to the embodiment of the present invention will be explained below. In a fourth embodiment example, an embodiment example of the optical transmission medium that is formed by rolling the optical fiber 1 in a coil shape will be explained. FIG. 6 is a schematic diagram illustrating an example of configuration of the optical transmission medium according to the fourth embodiment example of the present invention. As shown in FIG. 6, an optical transmission medium 20 according to the fourth embodiment example is formed by rolling the optical fiber 1 according to the embodiment of the present invention in a coil shape.

Specifically, the optical transmission medium 20 is implemented by winding the optical fiber 1 in a line shape of, for example, a length of 100 m in a coil shape, and hardening the optical fiber 1 bundled in a coil shape by using a resin or the like. In this case, the optical transmission medium 20 is formed with a coil having an inner diameter of 20 mm, an outer diameter of 30 mm, and a width of 8 mm.

The optical fiber 1 used for the optical transmission medium 20 can transmit a light in a wavelength band of equal to or longer than 1250 nm in a single mode while decreasing the macro-bending loss against the small-diameter bending to equal to or lower than 0.1 dB/m, even when the optical fiber 1 is rolled in a coil shape with a small-diameter bending with a curvature radius of equal to or larger than 3 mm and equal to or smaller than 60 mm. The macro-bending loss of the optical fiber 1 does not show any difference between a condition before rolled in a coil shape and after rolled, and an amount of loss increase caused by the macro-bending loss of the optical fiber 1 rolled in a coil shape is virtually zero (below measurement limit). In addition, the polarization mode dispersion of the optical fiber 1 rolled in a coil shape is equal to or smaller than $0.1$ ps/km$^{1/2}$.

A size of the optical transmission medium 20 using the optical fiber 1 can be easily made compact, and it is possible to transmit a light in a wavelength band of equal to or longer than 1250 nm in a single mode while decreasing the macro-bending loss to equal to or lower than 0.1 dB/m against the small-diameter bending with a curvature radius of equal to or larger than 3 mm and equal to or smaller than 60 mm. By connecting a standard SMF (e.g., a single mode fiber of a backbone system) and the like to the optical fiber 1 of the optical transmission medium 20, which is in a coil shape, a compact size in an equipment scale can be expedited, and at the same time, it is possible to realize various optical devices that can transmit a light in a wavelength band of equal to or longer than 1250 nm in a single mode while decreasing the macro-bending loss against the small-diameter bending with ease.

Fifth Embodiment Example

Figure 7:
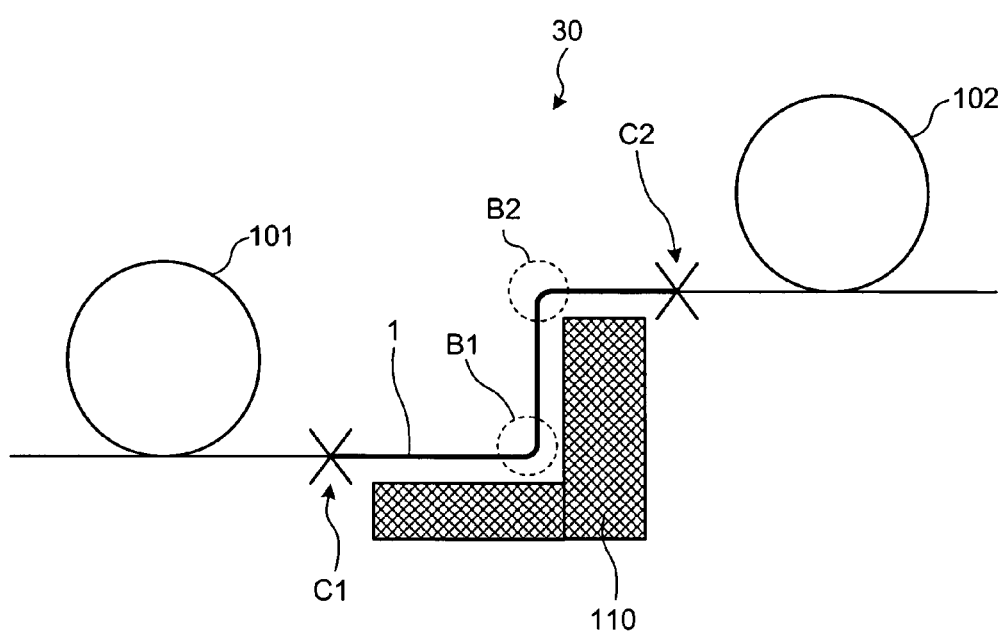
FIG. 7 is a schematic diagram illustrating an example of configuration of an optical transmission medium as a fifth embodiment example of the present invention.

A fifth embodiment example of the optical transmission medium according to the embodiment of the present invention will be explained below. In the fifth embodiment example, an embodiment example of the optical transmission medium that forms a waveguide by connecting a standard SMF (an optical fiber of a backbone system) to both ends of the optical fiber 1 will be explained. FIG. 7 is a schematic diagram illustrating an example of configuration of the optical transmission medium according to the fifth embodiment example of the present invention. As shown in FIG. 7, an optical transmission medium 30 according to the fifth embodiment example is implemented by connecting optical fibers 101 and 102 of a backbone system to both ends of the optical fiber 1 according to the embodiment of the present invention.

A small-diameter bending is formed at least one place of the optical fiber 1, and the optical fiber 101 and 102 of the backbone system are connected to both ends of the optical fiber 1. The optical fiber 101 and 102 of the backbone system are the standard SMFs described above. In this case, the optical fiber 101 of the backbone system is connected to the optical fiber 1 at a connecting portion C1, and the optical fiber 102 of the backbone system is connected to the optical fiber 1 at a connecting portion C2.

The optical transmission medium 30 having the above configuration is arranged in such a manner that the optical fiber 1 is installed along a surface of an obstacle 110, as shown in FIG. 7. In this case, the optical fiber 1 is laid on the obstacle 110, forming bending portions B1 and B2 shown in FIG. 7. The optical fiber 1 is bent at a substantially right angle while forming a small-diameter bending with a curvature radius r of 5 mm at each of the bending portions B1 and B2.

When a standard SMF (e.g., any one of the optical fibers 101 and 102 of the backbone system) is laid on the obstacle 110 instead of the optical fiber 1 of the optical transmission medium 30, and when transmitting a light having a wavelength of 1550 nm through the standard SMF, about 5 dB of macro-bending loss occurs at each of the bending portions B1 and B2 that are formed on the standard SMF. In other words, a total of about 10 dB of macro-bending loss occurs at two places of the bending portions B1 and B2. As a result, a transmission loss of a light becomes considerably high in the whole backbone system.

On the other hand, when transmitting a light having a wavelength of 1550 nm through the optical transmission medium 30 in which the optical fiber 1 is installed along the obstacle 110, an amount of loss increase caused by the macro-bending loss at the bending portions B1 and B2 is virtually zero (below measurement limit), and it is possible to reduce the macro-bending loss at the bending portions B1 and B2 to equal to or smaller than 0.1 dB. Furthermore, a connection loss caused by a connection (a mechanical splice or a fusion splice) between the optical fibers 101 and 102 of the backbone system and the optical fiber 1 at the connecting portions C1 and C2 is equal to or smaller than 0.1 dB. Therefore, a harmful effect due to the connection loss is low.

The optical transmission medium 30 having the above configuration can implement a waveguide that can suppress an increase of PMD while reducing the macro-bending loss even when the optical fiber 1 is installed, for example, along an obstacle that causes the bending portions B1 and B2, and can transmit a light in a wavelength band of equal to or longer than 1250 nm in a single mode. The waveguide formed with the optical transmission medium 30 can greatly suppress a transmission loss of a light in the whole backbone system, compared to a waveguide formed with the standard SMF (e.g., the optical fibers 101 and 102 of the backbone system) alone.

Figure 8:
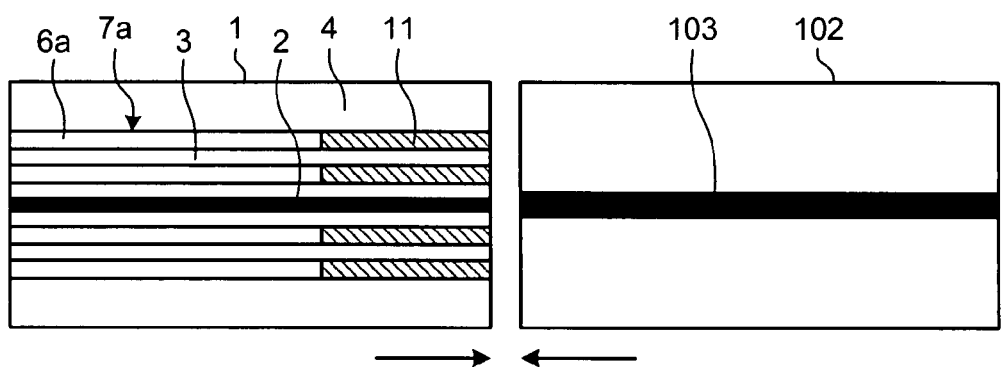
FIG. 8 is a schematic diagram illustrating an example of a method of connecting the optical fiber according to the embodiment of the present invention and a standard SMF.

The connection of the optical fiber 1 and the standard SMF (e.g., the optical fibers 101 and 102 of the backbone system) at the connecting portions C1 and C2 will be explained below. FIG. 8 is a schematic diagram illustrating an example of a method of connecting the optical fiber 1 according to the embodiment of the present invention and the standard SMF. An example of a connection method when connecting the optical fiber 1 of the optical transmission medium 30 according to the fifth embodiment example and the optical fiber 102 of the backbone system at the connecting portion C2 is shown in FIG. 8.

As shown in FIG. 8, the optical fiber 1 of the optical transmission medium 30 is connected to the optical fiber 102 of the backbone system, in a state in which the end portions of the holes formed in the first cladding region 3 (i.e., the holes in which the sub-medium regions 5a to 5f and 6a to 6f are filled) are sealed by a refractive-index matching agent 11. Specifically, the refractive-index matching agent 11 is filled in spaces of the end portions of the holes of the optical fiber 1, to seal the end portions of the holes. After that, the end portion of the optical fiber 1 with the end portions of the holes sealed is connected to an end portion of the optical fiber 102 of the backbone system. In this case, the optical fiber 1 and the optical fiber 102 of the backbone system are fusion sliced or mechanically connected by butt jointing the optical fiber 1 with the optical fiber 102 of the backbone system in such a manner that the center axis of the core region 2 is brought in line with the center axis of a core region 103 of the optical fiber 102 of the backbone system.

The refractive-index matching agent 11 filled in the end portions of the holes is a resin agent having a high viscosity, such as a grease, with a refractive index of 1.44 with respect to a light having a wavelength of 1550 nm. By filling the refractive-index matching agent 11 in the end portions of the holes, it is possible to make the refractive index of the end portions of the first cladding region 3 where the holes are formed close to the refractive index of the second cladding region 4 that is homogeneous. After all, the MFD at the end portion of the optical fiber 1 is enlarged, and becomes close to the value of the MFD of the optical fiber 102 of the backbone system. Furthermore, the refractive index at the end portion of the cladding region 8 consisting of the first cladding region 3 and the second cladding region 4 becomes substantially uniform. As a result, a connection loss caused by a Fresnel reflection can be reduced, and at the same time, it is possible to reduce the connection loss at the connecting portion C2, compared to a case in which the holes are not sealed. A result of measurements shows that the connection loss at the connecting portion C2 formed by the above connection method is equal to or smaller than 0.1 dB.

In addition, by sealing the end portions of the holes by the refractive-index matching agent 11, it is possible to prevent a foreign substance such as a dust from entering the internal space of the holes (or inside of the sub-medium regions) when connecting the optical fiber 1 and the optical fiber 102 of the backbone system. For instance, by filling the refractive-index matching agent 11 in the end portion of a hole 7a, it is possible to prevent the foreign substance from entering the internal space of the hole 7a, i.e., inside of the sub-medium region 6a.

Figure 9:
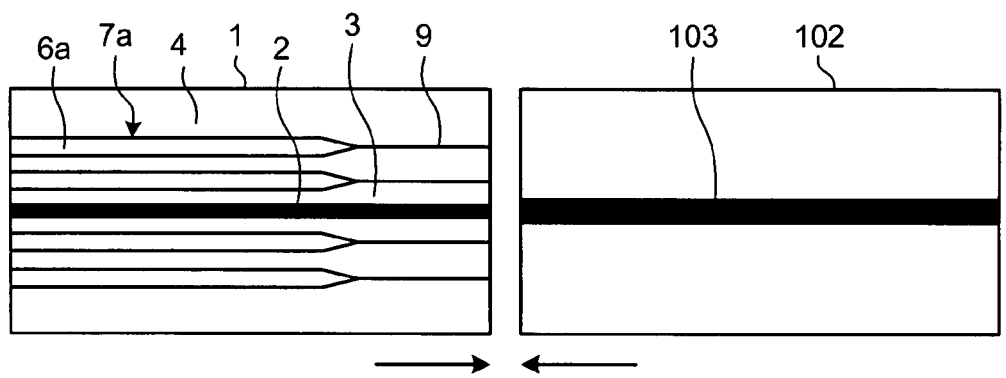
FIG. 9 is a schematic diagram illustrating an example of another method of connecting the optical fiber according to the embodiment of the present invention and a standard SMF.

Other method of connecting the optical fiber 1 and the optical fiber 102 of the backbone system will be explained below. In the method of connecting the optical fiber 1 and the optical fiber 102 of the backbone system, the method of closing the end portions of the holes of the optical fiber 1 is not limited to the filling of the refractive-index matching agent 11 in the end portions of the holes, but can be collapsing of the end portions of the holes. FIG. 9 is a schematic diagram illustrating an example of the other method of connecting the optical fiber 1 according to the embodiment of the present invention and a standard SMF. An example of a connection method when connecting the optical fiber 1 of the optical transmission medium 30 according to the fifth embodiment example and the optical fiber 102 of the backbone system at the connecting portion C2 in the same manner as the FIG. 8 is shown in FIG. 9.

As shown in FIG. 9, the optical fiber 1 of the optical transmission medium 30 is connected to the optical fiber 102 of the backbone system, in a condition in which the end portions of the holes formed in the first cladding region 3 (i.e., the holes in which the sub-medium regions 5a to 5f and 6a to 6f are filled) are closed by collapsing the end portions. Specifically, the end portions of the holes of the optical fiber 1 are collapsed by a heating process, to close the end portions of the holes. After that, the end portion of the optical fiber 1 with the end portions of the holes closed (i.e., in a condition in which a closed portion 9 is formed) is connected to a end portion of the optical fiber 102 of the backbone system. In this case, the optical fiber 1 and the optical fiber 102 of the backbone system are fusion sliced or mechanically connected by butt jointing the optical fiber 1 with the optical fiber 102 of the backbone system in such a manner that the center axis of the core region 2 is brought in line with the center axis of the core region 103 of the optical fiber 102 of the backbone system.

By forming the closed portion 9 at the end portions of the holes as described above, it is possible to make the refractive index of the end portions of the first cladding region 3 close to the refractive index of the second cladding region 4 that is homogeneous. With this scheme, it is possible to obtain the same operation effect as the case in which the refractive-index matching agent 11 is filled in the end portions of the holes. Therefore, a connection loss caused by a Fresnel reflection can be reduced, and at the same time, it is possible to reduce the connection loss at the connecting portion C2, compared to a case in which the holes are not closed. A result of measurements shows that the connection loss at the connecting portion C2 formed by the above connection method is equal to or smaller than 0.1 dB.

When performing a fusion slice of the optical fiber 1 with the end portions of the holes collapsed and the optical fiber 102 of the backbone system, a discharging power to perform the fusion slicing at the end portions of the optical fiber 1 and the optical fiber 102 of the backbone system is set to be extremely low, and a discharging time is set to be long. In this manner, the fusion slicing is performed by slowly collapsing the end portions of the holes. It is to prevent a cavity or a defect portion from occurring at the end portion of the optical fiber 1 because, if a high power is abruptly discharged at the end portion of the optical fiber 1, each of the holes is expanded and disrupted, which causes the cavity or the defect portion at the end portion of the optical fiber 1.

The two connection method described above is not limited to the connection of the optical fiber 1 and the optical fiber 102 of the backbone system at the connecting portion C2, but can be applied to a connection of the optical fiber 1 and the optical fiber 101 of the backbone system at the connecting portion C1. In other words, by connecting the optical fiber 1 and the optical fiber 101 of the backbone system based on any one of the two connection method, a connection loss caused by a Fresnel reflection can be reduced, and at the same time, it is possible to reduce the connection loss at the connecting portion C1, compared to a case in which the holes are not closed, in the same manner as the case of the connecting portion C2. The same goes for a case in which the standard SMF is connected to both ends of the optical fiber 1 of the optical transmission medium 20 according to the fourth embodiment example.

As described above, according to the embodiment of the present invention, a sub-medium region having a refractive index lower than that of a main-medium region is arranged at each point of a predetermined number (e.g., six) folds rotational symmetry centering on a core region in a cladding region that is arranged on the outer circumference of the core region, and a sub medium group is arranged in the cladding region in a multilayer. At the same time, from among the sub medium groups arranged in multilayer, the lateral cross section of the sub-medium region on the outer side is configured to be larger than the lateral cross section of the sub-medium region on the inner side. With this scheme, it is possible to reduce the number of sub-medium regions to be arranged in the cladding region to confine the fundamental mode alone in the core region, and to reduce a macro-bending loss against a small-diameter bending. As a result, it is possible to form a microstructure in which the sub medium groups are arranged in multilayer in the cladding region with ease, to increase manufacturability, and to realize an optical fiber that can reduce the macro-bending loss against the small-diameter bending while confining the fundamental mode alone in the core region.

Specifically, the optical fiber according to the present invention can reduce the macro-bending loss against a small-diameter bending with a curvature radius r of 7.5 mm to equal to or lower than 0.1 dB/m, and at the same time, can transmit a light in a wavelength band of equal to or longer than 1280 nm in a single mode.

Furthermore, because the MFD of the optical fiber according to the present invention can be set to equal to or larger than 6 μm and equal to or smaller than 11 μm, it is possible to make the MFD of the optical fiber close to the MFD of a standard SMF. As a result, it is possible to reduce the connection loss caused when connecting the optical fiber according to the present invention to the standard SMF.

Moreover, centers of the lateral cross sections of the sub-medium regions on the inner side and the sub-medium regions on the outer side arranged in the cladding region in multilayer are respectively located on concentric circles having the center of the lateral cross section of the core region as the common center. Therefore, the sub-medium regions on the inner side and the sub-medium regions on the outer side can be easily arranged at each point of a predetermined number (e.g., six) folds rotational symmetry. As a result, it is possible to increase manufacturability of the optical fiber according to the present invention with ease.

Furthermore, the sub medium groups are arranged in multilayer in such a manner that a line passing the centers of each of the lateral cross sections of the sub-medium regions on the inner side and the center of the lateral cross section of the core region (e.g., the line A1 and A2) and a line passing the centers of each of the lateral cross sections of the sub-medium regions on the outer side and the center of the lateral cross section of the core region (e.g., the line A3) forms a predetermined angle (i.e., not on the same line). Therefore, an interval between the sub-medium regions on the inner side and the sub-medium regions on the outer side can be expanded. As a result, it is possible to form a plurality of holes for arranging the sub-medium regions in multilayer in the cladding region with ease; and therefore, the manufacturability of the optical fiber according to the present invention can be further increased.

Moreover, by using the optical fiber according to the present invention, it is possible to implement an optical transmission medium in a line shape or a coil shape that can reduce the macro-bending loss against a small-diameter bending with a curvature radius of equal to or larger than 3 mm and equal to or smaller than 60 mm to equal to or smaller than 0.1 dB/m, and at the same time, can transmit a light in a wavelength band of equal to or longer than 1280 nm in a single mode.

By using the optical transmission medium according to the present invention, a compact size in an equipment scale or in a system scale can be expedited, and at the same time, it is possible to realize a waveguide or an optical device that can transmit a light in a wavelength band of equal to or longer than 1280 nm in a single mode while decreasing the macro-bending loss against the small-diameter bending with ease.

Although a silica glass doped with a dopant or a pure silica glass is used as the main medium of the core region and the cladding region of the optical fiber according to the embodiment and the first to the fifth embodiment examples of the present invention, the present invention is not limited to this scheme, but a synthetic resin such as an optically transparent plastic can be used as the main medium.

Furthermore, although a gaseous substance such as the air, a liquid, or a solid substance is used as the sub-medium regions arranged in the cladding region according to the embodiment and the first to the fifth embodiment examples of the present invention, the present invention is not limited to this scheme, but a silica glass or an optically transparent plastic can be used as the sub-medium regions.

Moreover, although the sub-medium regions are respectively arranged at the six folds rotational symmetry centering on the core region in the cladding region according to the embodiment and the first to the fifth embodiment examples of the present invention, but the present invention is not limited to this scheme, but the sub-medium regions can be respectively arranged at a plurality of folds rotationally symmetric centering on the core region in the cladding region.

Furthermore, although the holes are formed in the cladding region by using a mechanical drill according to the embodiment and the first to the fifth embodiment examples of the present invention, the present invention is not limited to this scheme, but the holes can be formed by a silica tube by arranging the silica tube in the cladding region. By forming the holes by using the mechanical drill or the silica tube, and forming the sub-medium regions by filling a gaseous substance in the holes, the optical fiber 1 can be manufactured with ease and low cost, compared to a case in which a liquid or a solid substance is arranged in the cladding region.

Moreover, although the two layers of the sub-medium regions are arranged in the cladding region according to the embodiment and the first to the fifth embodiment examples of the present invention, the present invention is not limited to this scheme, but more than two layers of the sub-medium regions can be arranged in the cladding region.

INDUSTRIAL APPLICABILITY

As described above, the optical fiber and the optical transmission medium according to the present invention are effective in a single mode optical transmission for transmitting a light in a single mode, and more particularly, are suitable for an optical fiber and an optical transmission medium that can lower the macro-bending loss against a small-diameter bending while realizing the single mode optical transmission.

The invention claimed is:

1. An optical fiber including a core region and a cladding region, wherein
the cladding region includes a first cladding region on an outer circumference of the core region, the first cladding region consisting of a main-medium region and a sub-medium region, a refractive index of the sub-medium region being lower than a refractive index of the main-medium region,
the sub-medium region includes a plurality of inner sub-medium regions arranged along the outer circumference of the core region and a plurality of outer sub-medium regions arranged on an outer side of the inner sub-medium regions along the outer circumference of the core region, and
a lateral cross section of the outer sub-medium regions is larger than a lateral cross section of the inner sub-medium regions, wherein a macro-bending loss with a curvature radius of 5.0 millimeters at a wavelength of 1550 nanometers is equal to or less than 0.1 decibel per meter.

2. The optical fiber according to claim 1, wherein a center of each lateral cross section of the outer sub-medium regions is located in a region sandwiched by lines formed by connecting a center of each lateral cross section of the inner sub-medium regions adjacent to each other and a center of a lateral cross section of the core region.

3. The optical fiber according to claim 1, wherein the center of each lateral cross section of the inner sub-medium regions and the center of each lateral cross section of the outer sub-medium regions are respectively located in a concentric manner centering on the center of the core region.

4. The optical fiber according to claim 1, wherein
the inner sub-medium regions are respectively arranged at six folds rotationally symmetric centering on the core region, and
the outer sub-medium regions are respectively arranged at six folds rotationally symmetric centering on the core region.

5. The optical fiber according to claim 1, wherein
a hole is formed at each position where the sub-medium region is arranged, along a center axis of the core region, and
the sub-medium region is composed of any one of a gaseous substance, a liquid, and a solid substance that fills inside of the hole.

6. The optical fiber according to claim 1, wherein
the cladding region further includes a second cladding region on an outer circumference of the first cladding region, the second cladding region being homogeneous, and
a relative refractive index difference between the core region and the second cladding region is equal to or larger than 0.3% and equal to or smaller than 0.4%.

7. The optical fiber according to claim 6, wherein a medium of the second cladding region is a pure silica glass.

8. The optical fiber according to claim 6, wherein a medium of the second cladding region is a fluorine-doped silica glass.

9. The optical fiber according to claim 6, wherein a medium of the second cladding region is same as a medium that forms the main-medium region of the first cladding region.

10. The optical fiber according to claim 1, wherein the core region is formed by a silica glass doped with at least one of germanium and phosphorus.

11. The optical fiber according to claim 1, wherein a light having a wavelength of equal to or longer than 1500 nanometers propagates through the optical fiber in a single mode.

12. The optical fiber according to claim 1, wherein a light having a wavelength of equal to or longer than 1280 nanometers propagates through the optical fiber in a single mode.

13. The optical fiber according to claim 1, wherein
a mode field diameter at a wavelength of 1550 nanometers is equal to or larger than 6 micrometers and equal to or smaller than 11 micrometers.

14. An optical transmission medium comprising:
an optical fiber in a state in which the optical fiber is bent with a curvature radius of equal to or larger than 3 millimeters and equal to or smaller than 60 millimeters, the optical fiber including a core region and a cladding region, wherein
the cladding region includes a first cladding region on an outer circumference of the core region, the first cladding region consisting of a main-medium region and a sub-medium region, a refractive index of the sub-medium region being lower than a refractive index of the main-medium region,
the sub-medium region includes a plurality of inner sub-medium regions arranged along the outer circumference of the core region and a plurality of outer sub-medium regions arranged on an outer side of the inner sub-medium regions along the outer circumference of the core region, and
a lateral cross section of the outer sub-medium regions is larger than a lateral cross section of the inner sub-medium regions, and
a macro-bending loss with a curvature radius of 5.0 millimeters at a wavelength of 1550 nanometers is equal to or less than 0.1 decibel per meter.

15. The optical transmission medium according to claim 14, wherein the optical fiber is in a state in which the optical fiber is rolled in a coil with the curvature radius of equal to or larger than 3 millimeters and equal to or smaller than 60 millimeters.

16. The optical transmission medium according to claim 14, wherein the optical fiber is connected to an other optical fiber in a state in which an end of the sub-medium region formed in the cladding region along the center axis of the core region is blocked.

17. The optical transmission medium according to claim 16, wherein the end of the sub-medium region is blocked by filling a predetermined filling agent in the end of the sub-medium region.

18. The optical transmission medium according to claim 16, wherein the end of the sub-medium region is blocked by collapsing the end of the sub-medium region.

* * * * *